United States Patent Office 3,169,970
Patented Feb. 16, 1965

3,169,970
**3-(5 - NITRO - 2 - FURYL) - 5,6 - DIHYDROIMIDAZO-
[2,1-b]THIAZOLE AND ACID ADDITION SALTS
THEREOF**
Harry R. Snyder, Jr., Norwich, N.Y., assignor to The
Norwich Pharmacal Company, a corporation of
New York
No Drawing. Filed Jan. 31, 1963, Ser. No. 255,227
4 Claims. (Cl. 260—306.8)

This invention relates to novel chemical compounds. More particularly it is concerned with 3-(5-nitro-2-furyl)-5,6-dihydroimidazo[2,1-b]thiazole and its mineral acid salts. This invention is also concerned with a method for making this novel chemical compound and its salts and with compositions containing them as an essential toxic constituent.

The new compound of this invention may be represented by the formula:

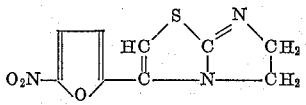

Its mineral acid salts may be represented by the formula:

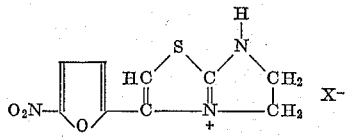

wherein X is a chloro or bromo atom. These compounds are crystalline solids and the salts are readily soluble in water. They have been found to be useful as parasiticides. They are particularly distinguished by their antibacterial and antifungal action and are adapted to be employed as a toxic constituent of compositions designed to prevent and eradicate the growth of fungi and bacteria.

In contrast to past nitrofurans, the compound of this invention and its salts possess a surprisingly greater spectrum of antibacterial activity extending to bacteria such as Psudomonas which have heretofore oftentimes proved to be recalcitrant and resistant to the action of these agents. This behavior is manifested by either the compound or its salts as shown in the table herebelow which is representative of the broad scope of activity against organisms recognized as being causative agents in many animal diseases.

| Bacterial Species | Minimum Inhibitory Concentration in mg. Percent | | |
|---|---|---|---|
| | I [1] | II [2] | III [3] |
| Staphylococcus aureus | 0.625 | 0.625 | 0.625 |
| Escherichia coli | <0.075 | <0.075 | <0.075 |
| Pseudomonas aeruginosa | 2.5 | 2.5 | 2.5 |
| Proteus vulgaris | 2.5 | 1.25 | 2.5 |
| Salmonella typhosa | <0.075 | <0.075 | <0.075 |
| Streptococcus pyogenes | 0.625 | 0.31 | 0.625 |
| Streptococcus agalactiae | 2.5 | 2.5 | 2.5 |
| Erysipelothrix rhusiopathiae | 0.15 | 0.15 | 0.15 |
| Aerobacter aerogenes | 0.31 | 0.31 | 0.31 |

The notation "<" means "less than."
[1] I=3-(5-nitro-2-furyl)-6, 7-dihydro-5H-imidazo [2, 1-b] thiazolium bromide.
[2] II=3-(5-nitro-2-furyl)-5,6-dihydroimidazo [2, 1-b] thiazole.
[3] III=3-(5-nitro-2-furyl)-6, 7-dihydro-5H-imidazo [2, 1-b] thiazolium chloride.

In addition to the very great antibacterial activity possessed by these compounds, they also display a desirable antifungal action. For instance, Nocardia asteroides and Microsporum canis are species of fungi susceptible to them.

These compounds are well suited to be employed in the form of unguents, suspensions, dusts, solutions and the like for the prevention and treatment of skin infections. A preferred embodiment in this respect is a composition comprising a mixture of liquid and solid polyethylene glycols as the vehicle, about 0.23% by weight thereof of 3 - (5-nitro-2-furyl)-6,7-dihydro-5H-imidazo[2,1-b]thiazolium chloride and, advantageously, a small amount of hydrochloric acid of the order of about 0.106% by weight of the vehicle as a stabilizing agent. The application of such a composition to the abraded skin of rabbits elicits no adverse response.

The compound of this invention and its salts are readily prepared. It is presently preferred to initially prepare a salt such as the bromide by bringing together bromomethyl 5-nitro-2-furyl ketone and ethylene thiourea in the presence of a solvent such as ethanol. To hasten the reaction heat may be supplied to the reaction mixture. When the reaction is completed the desired product, 3-(5-nitro - 2-furyl)-6,7-dihydro-5H-imidazo[2,1-b]thiazolium bromide, is recovered in conventional fashion as by cooling the mixture and filtering. If it is desired, the product may be recrystallized from a suitable solvent such as methanol. The salt is readily transformed to the base by dissolving it in water and neutralizing the aqueous solution by the addition of a base. A mild base, such as sodium carbonate, serves to effectively accomplish this purpose. The base, 3-(5-nitro-2-furyl)-5,6-dihydroimidazo-[2,1-b]thiazole, may be readily converted to a salt. For instance, a solution of it in methanol when treated with concentrated hydrochloric acid produces the chloride salt.

In order that this invention may be readily available to and understood by those skilled in the art, the following illustrative but not limitative examples are appended.

EXAMPLE I

*3-(5-nitro-2-furyl)-6,7-dihydro-5H-imidazo[2,1-b]thiazolium bromide*

Bromomethyl 5-nitro-2-furyl ketone (46.8 g., 0.2 mole), ethylene thiourea (20.4 g., 0.2 mole) and ethanol (5600 ml.) are placed in a flask and refluxed for four hours. The mixture is cooled and filtered to yield 58.0 g. (91%) (M.P. 242–244° C. d.) of 3-(5-nitro-2-furyl)-6,7-dihydro-5H-imidazo[2,1-b]thiazolium bromide. It may be recrystallized from methanol (M.P. 244–245° C.).

Analysis:

| | C | H | Br | N |
|---|---|---|---|---|
| Calc. for $C_9H_8BrN_3O_3S$ | 33.97 | 2.53 | 25.12 | 13.21 |
| Found | 34.33 | 2.58 | 24.71 | 13.26 |

EXAMPLE II

*3-(5-nitro-2-furyl)-5,6-dihydroimidazo[2,1-b]thiazole*

3-(5-nitro-2-furyl)-6,7-dihydro-5H-imidazo[2,1-b]thiazolium bromide (184 g., 0.58 mole) is dissolved in approximately 20.1 of water. The solution is stirred and neutralized with aqueous sodium carbonate (pH=7.5). The mixture is filtered. The product is washed with water and dried at 65° C. It may be crystallized from benzene-hexane mixture.

| | C | H | N |
|---|---|---|---|
| Calc. for $C_9H_7N_3O_3S$ | 45.56 | 2.98 | 17.71 |
| Found | 45.64 | 3.02 | 17.37 |

EXAMPLE III

*3-(5-nitro-2-furyl)-6,7-dihydro-5H-imidazo[2,1-b]thiazolium chloride*

3 - (5-nitro-2-furyl)-5,6,-dihydroimidazo[2,1-b]thiazole (80 g., 0.336 mole) is placed in a flask together with a large volume of methanol. The mixture is heated slightly to aid solution. The solution is acidified with conc. hydrochloric acid (pH ca. 2) and filtered while warm. The solution is then cooled and filtered. The product is washed with ether and dried at 65° C. The yield is 73 g. (79.5%), M.P. dec. 250° C. It may be recrystallized from methanol.

|  | C | H | Cl |
|---|---|---|---|
| Calc. for $C_9H_8ClN_3O_3S$ | 39.49 | 2.94 | 12.96 |
| Found | 39.52 | 3.06 | 13.34 |

What is claimed is:
1. A member of the group consisting of a compound of the formula:

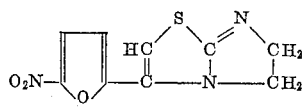

and a mineral acid salt thereof.

2. 3 - (5 - nitro - 2 - furyl)-6,7-dihydro-5H-imidazo[2,1-b]thiazolium chloride.
3. 3 - (5-nitro-2-furyl)-5,6-dihydroimidazo[2,1-b]thiazole.
4. 3 - (5-nitro-2-furyl)-6,7-dihydro-5H-imidazo[2,1-b]thiazolium bromide.

References Cited in the file of this patent
UNITED STATES PATENTS

| 2,354,940 | Carter et al. | Aug. 1, 1944 |
| 2,485,330 | Stewart et al. | Oct. 18, 1949 |
| 2,780,629 | Kauer | Feb. 5, 1957 |
| 3,055,910 | Dickson et al. | Sept. 25, 1962 |

OTHER REFERENCES

Fefer et al.: J. Org. Chem., vol. 26, pages 828–835 (1961).

Burger: Medicinal Chemistry (New York, 1960), pages 79–81, and 1135.

Richter's Organic Chemistry (New York, 1947), pages 14–15.